United States Patent
Suen et al.

(10) Patent No.: US 6,552,750 B1
(45) Date of Patent: Apr. 22, 2003

(54) APPARATUS FOR IMPROVING THE PRESENTATION OF GRAPHICS DATA ON A TELEVISION DISPLAY

(75) Inventors: Jeff Jang-Fang Suen, San Jose, CA (US); Bo Liu, Fremont, CA (US)

(73) Assignee: TVIA, Inc., Santa Clara, CA (US)

( * ) Notice: Subject to any disclaimer, the term of this patent is extended or adjusted under 35 U.S.C. 154(b) by 0 days.

(21) Appl. No.: 09/531,392

(22) Filed: Mar. 21, 2000

(51) Int. Cl.[7] ............................................. H04N 5/44
(52) U.S. Cl. ...................................... 348/561; 348/565
(58) Field of Search .................................. 348/561, 562, 348/564, 565, 566, 567, 568, 581; 345/660, 671; 382/298, 300, 301; H04N 5/44

(56) References Cited

U.S. PATENT DOCUMENTS

| | | | | |
|---|---|---|---|---|
| 4,971,448 A | * | 11/1990 | Van Zon | 348/565 |
| 5,598,222 A | * | 1/1997 | Lane | 348/565 |
| 5,673,079 A | * | 9/1997 | Satoh | 348/14.1 |
| 5,852,474 A | * | 12/1998 | Nakagaki et al. | 348/564 |
| 6,226,040 B1 | * | 5/2001 | Kuo et al. | 345/212 |
| 6,310,656 B1 | * | 10/2001 | Miyazaki et al. | 348/565 |
| 6,333,731 B1 | * | 12/2001 | Baek | 345/620 |

* cited by examiner

*Primary Examiner*—Michael H. Lee
(74) *Attorney, Agent, or Firm*—Stephen L. King

(57) ABSTRACT

A circuit for converting a selected portion of graphics data generated for a computer display for presentation on a selected portion of a television display including a first data path for transferring graphics data from a frame buffer memory storing graphics data to a television display without changing the size of the data, a second data path for transferring graphics data from the frame buffer memory storing graphics data to the television display while selectably changing the size of the data, the second data path including circuitry for selecting a portion of the television display to present the selected data transferred by the second data path, and zooming circuitry for enlarging data transferred by the second data path to fill the selected portion of the television display, and means for selecting data stored in the frame buffer for display.

14 Claims, 2 Drawing Sheets

APPARATUS FOR IMPROVING THE PRESENTATION OF GRAPHICS DATA ON A TELEVISION DISPLAY

BACKGROUND OF THE INVENTION

1. Field of the Invention

This invention relates to computer systems and, more particularly, to methods and apparatus for changing the size of graphic data for presentation on an television output display.

2. History of the Prior Art

There have been various attempts to combine video data (data used to display television) and graphics data (data used to provide a computer display) for presentation on an output display. Most of these attempts have been directed to providing television programs in a window on a computer screen.

Only a few attempts have been made to provide computer graphics output on a television output display. Because the format of the two sources is so different, it has been the practice to import the video signals into computer frame buffer memory, change the various signals to the format utilized on the chosen output display, combine the signals, and transfer the data to the output display. In general, this has slowed the presentation of all data on the output display because of the large amount of bus time occupied by the video data.

Recently a system utilizing new methods and apparatus for combining video and computer graphics data has been devised. The system is capable of producing displays which accurately present and are capable of differentiating each of the individual streams for presentation on either an analog or a digital output display. The system is especially designed to provide data streams for digital information displays which appear to be the choice for the future of both television and computers. Such a system is described in detailed in U.S. patent application Ser. No. 09/276,878, entitled Method And Apparatus For Combining Video And Graphics, Jhi-Chung Kuo et al, filed Mar. 26, 1999, and assigned to the assignee of the present invention.

A major use of the new system is to present on a television output display graphical information originating on the internet and especially on the World Wide Web. One of the problems encountered in attempting to display graphical data originating on the web is that most such data is originally generated by a computer system and is intended to be displayed on a computer output display. A computer display typically offers a much more detailed picture than a television display, and pictures which are quite clear and readable on a computer display are often undecipherable on a television output display. This is often because the fonts utilized are simply too small for display by a television display.

In order to overcome this problem, the prior art has typically utilized software running on the processor which is obtaining the graphical data from the internet to enlarge the computer-generated image sufficiently for display on a television screen. A problem with this approach is that processors utilized to access the web are often those included in "set top boxes." Such processors are typically less powerful that those used by a typical computer. Using a slow processor to access computer graphics data in a frame buffer, to enlarge that data using software executing on the processor, and to rewrite the enlarged data to the frame buffer for presentation on the television output display often produces an unsatisfactory result.

To obviate this difficulty, some web sites produce one set of output signals for computer displays and another set of output signals for television displays. Producing two sets of data is quite expensive and, consequently, is not practiced by the majority of web sites which it might be desirable to display on a television screen.

Another difficulty encountered is that graphical display data originating on the web or from some other computer-generated source is usually of a shape different from that designed for a television display. Many images have been individually created by graphics artists for computer use. In order to display such images on television, an artist must often prepare separate images for a television display at additional expense.

An additional problem with material generated originally for display by a computer is that text is often presented in a color index format. In such a format, index values for pixels utilize a lookup table to provide color values for presentation on a computer display. Index values themselves cannot be enlarged for presentation on a television display because they bear no relation to the color values they represent except through a lookup table. The attempt to enlarge index values provides representations which are often quite unattractive when presented on a television display.

It is desirable to provide means by which computer graphics images may be readily utilized for display on a television output display at an acceptable output rate without excessive cost.

SUMMARY OF THE INVENTION

The present invention is realized by a circuit utilized to convert a selected portion of graphics data generated for a computer display into video data for presentation on a selected portion of a television display comprising a first data path for transferring graphics data from a source of graphics data to a television display without changing the size of the data, a second data path for transferring graphics data from a the source of graphics data to a television display while selectably changing the size of the data, the second data path including circuitry for selecting a portion of the television display on which to present the selected data transferred by the second data path, and zooming circuitry for enlarging data transferred by the second data path to fill the selected portion of the television display.

This and other objects and features of the invention will be better understood by reference to the detailed description which follows taken together with the drawings in which like elements are referred to by like designations throughout the several views.

DETAILED DESCRIPTION

Figure 1:
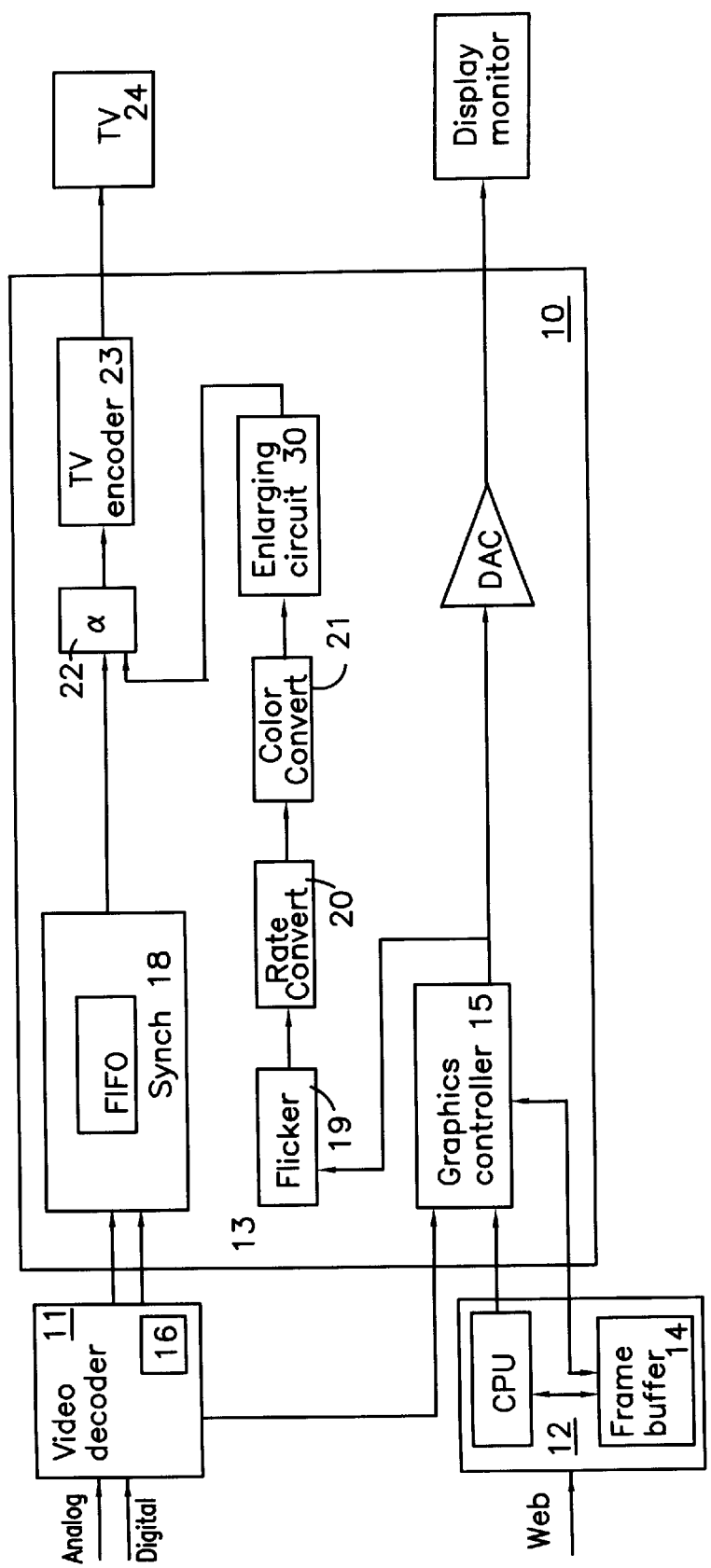
FIG. 1 is a block diagram illustrating a system which may be utilized in practicing the present invention.

FIG. 1 is a block diagram illustrating a system 10 designed in accordance with the present invention. The system 10 receives both digital and analog video signals from a source of video signals and digital computer graphics signals from a source of digital computer graphics signals.

The video signals are received at a video decoder 11, are decoded, and are transferred to a synchronization circuit 18. Typically the video signals are furnished as composite signals including both the data defining pixel positions and the horizontal and vertical synchronization signals defining the beginnings of lines and frames. External or internal clock signals may similarly be provided for synchronization and other timing purposes, and a general source 16 is illustrated within the video decoder for providing these clock signals to the system.

Typically, the external source of computer graphics signals is the output of a computer graphics device furnishing computer graphics signals in a digital red/green/blue format. The computer graphics signals are either generated at or received by a computer system 12 and are placed in a frame buffer 14 under control of a graphics controller circuit 15. The locally-positioned computer might be a typical computer including a relatively powerful processor capable of rapidly generating or downloading data, a set top box utilizing similar but less powerful circuitry than a typical computer, or some other source of computer graphics signals.

As is known to those skilled in the art, television signals are typically furnished in an interlaced format in which a picture is generated from two sequential frames, a first frame consisting of every other horizontal line to be displayed on an output display followed by a second frame consisting of the intervening lines omitted from the first frame. By furnishing first one frame and then a second frame, the motion typical to a television display is smoothly presented. The format of a television display is typically presented 29.97 interlaced frames (totaling 59.94 frames) per second in NTSC format. The format of a television display typically represents each pixel in YUV format with a variable number of bits per pixel for each element represented.

Graphics signals, on the other hand, are usually furnished in a non-interlaced format at sixty frames per second. In a non-interlaced format, each frame includes all of the horizontal lines which define the picture displayed. Graphics data may be represented in any of a number of different formats. In most of these formats, the bits are divided into groups representing red, green, and blue colors. A pixel in these formats often includes bits which may be utilized to provide other data such as alpha blending data. For example, a sixteen bit format often utilizes five bits for each of the three colors and one bit for alpha blending purposes. Another sixteen bit format utilizes four bits for each of the three colors and for alpha blending. Other graphics formats may provide alpha values in a similar manner utilizing the same or other numbers of bits to represent the alpha value.

As is understood by those skilled in the art, the differences in interlaced and non-interlaced formats and the frame rates at which they appear require that one of the input signal data streams be modified to be similar to the other input signal data stream when the signals are to be presented on the same television display. In addition, the difference in the YUV and RGB formats require that the color determinations be changed to be the same. If the two data streams are to be presented on a television display, then both signal streams should be presented in YUV format. In addition, the different bit formats used to represent the television signals and the graphics data must be made the same in order to be correctly represented on the television display.

As a first step, the clock signal is used by the synchronization circuit 18 to synchronize the video and graphics signals to function with the same timing. To accomplish the synchronization conveniently in the system 10, a large first-in/first-out (FIFO) buffer is provided into which the stream of video data is placed. The video data received is combined using the horizontal and vertical synchronization signals. The large FIFO buffer allows the video signal to be appropriately synchronized with the graphics signals for essentially an entire horizontal line of video data. The clock is then used to determine the appropriate intervals between horizontal and vertical synchronization signals of each of the data input streams.

As pointed out, graphics data is typically furnished in non-interlaced form at a rate of 60 frames per second while video data is furnished in interlaced form at a rate of 29.97 frames (59.94 interlaced frames) per second. This rate is different for formats other than NTSC. Since the television display accepts the interlaced form at 29.97 frames per second, the graphics data must be placed in this format and synchronized with the video data. Synchronizing the two streams of data in the circuit 18 by utilizing the same clock for each adjusts the frame display rate to the correct 29.97 frames per second (or other rate for other formats) utilized by the television display. With the frame rate the same, the horizontal and vertical synchronization signals of each of the two streams of data which are used to determine the beginning of each horizontal and vertical sweep of the display are caused to occur together.

Once the digital video signal stream has been transferred into the system 10 and synchronized with the graphics data stream by the synchronization circuitry 18, it is presented without other modification to alpha blending circuitry 22. The alpha blending circuitry combines the video and computer graphics input signals for transfer via an encoder circuit 23 to a television display 24. By sending the video signals directly to the display circuitry without modification other than alpha blending, the bandwidth required by prior art arrangements to send video signals to computer memory and retrieve those signals from memory is eliminated; and the operation of the system is greatly accelerated.

In order to provide the graphics data stream in the correct format for display on a television display, the graphics stream provided by the graphics controller is furnished to a flicker control circuit 19 and a rate convert circuit 20 which together divide the graphics data into the two frames necessary to provide images on a television display. Since the normal interlaced images which make up every other horizontal line on the output display are furnished to a television display separated in time, the images furnished by the two interlaced frames are slightly different from one another whenever motion is involved. If non-interlaced graphics frames are simply divided into two sequential frames consisting of all odd numbered horizontal lines and all even numbered horizontal lines, then the resulting interlaced frames will not have the correct time difference; and the output image will appear to flicker.

The flicker control circuit 19 removes this flicker using one of a number of techniques known to the prior art. Once the flicker has been removed by the flicker control circuit, the graphics data stream is transferred to the rate convert circuit 20 in which the alternate lines of the graphics frame are selected for inclusion in the two successive frames which make up the total interlaced display. The resulting graphics output is then in the same interlaced form and appears at the same rate as the video signal stream to which it is synchronized.

At this point, the two streams are such that they could be combined except that the video stream carries its color and data information in YUV format, while the graphics stream utilizes RGB coding to indicate that type of information. Since a television display responds to YUV information, the graphics data stream is transferred to a color convert circuit 21 which utilizes well known algorithms to transfer the RGB color information into YUV information. The resulting stream of graphics data from the circuit 21 may then be transferred to the alpha blending circuit 22 for combination with the video data stream.

The present invention offers the option of selecting any portion of the graphics image for enlargement by an enlarging circuit 30 before combining the two streams in the alpha blending circuitry. Whether the graphics image is actually enlarged or not, the result produced by the enlarging circuit is then transferred to the alpha blending circuitry 22 for combination with the video data stream.

It will, of course, be apparent to those skilled in the art that the circuitry of the invention for providing graphics images to the television display may be entirely separate from video display circuitry so that it is utilized to furnish only graphics signals which are displayed on a television display without combination with video display information.

Figure 2:
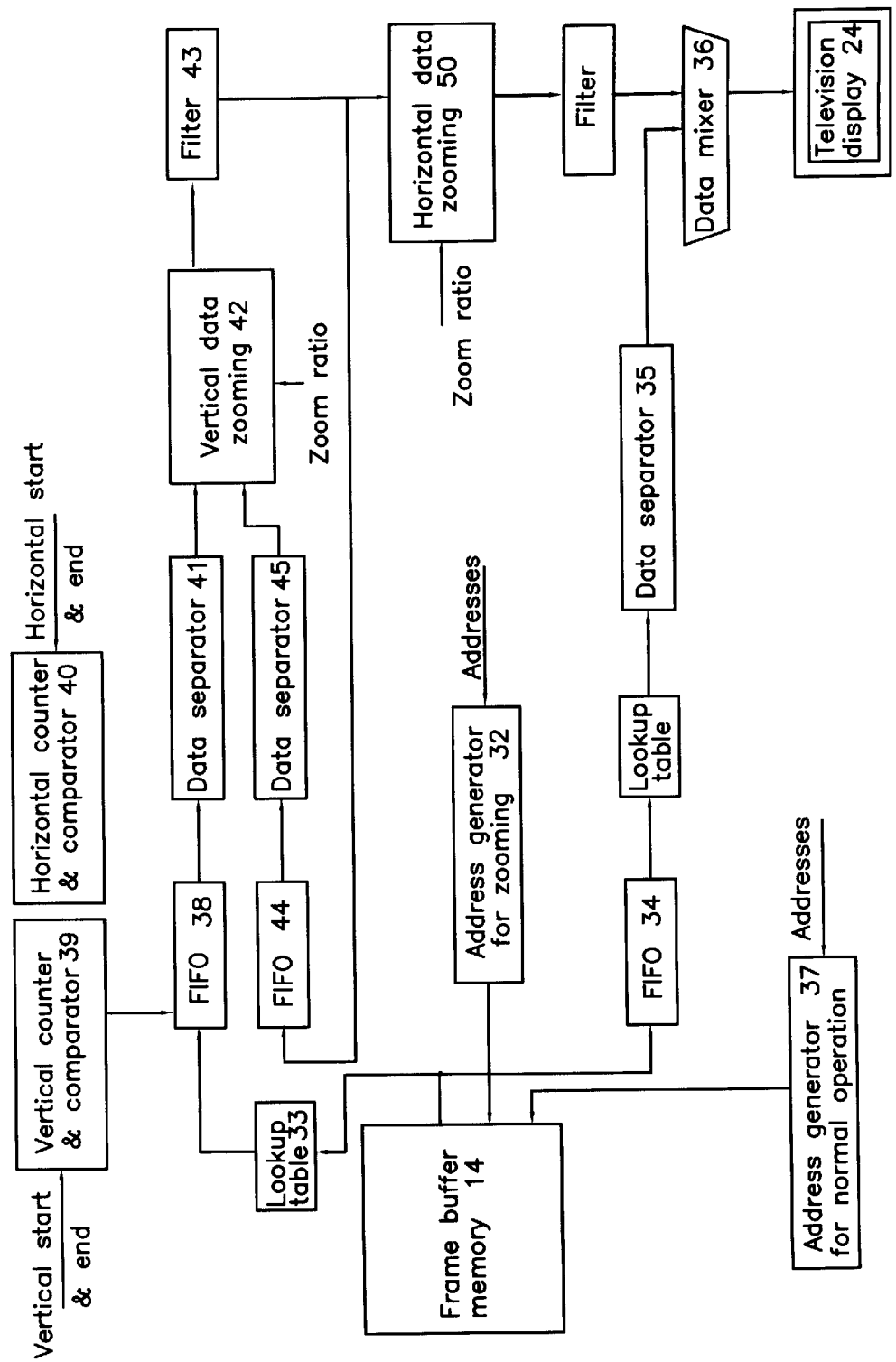
FIG. 2 is a detailed illustration of one embodiment of a portion of the system illustrated in FIG. 1 utilized in practicing the present invention.

Referring now to FIG. 2, there is illustrated a block diagram of one embodiment of an enlarging circuit 30 illustrated in FIG. 1. The circuit 30 utilizes data from frame buffer memory 14 which stores graphics data to be displayed. During normal operation of the system 10, data selected by means of signals provided by a first address generating circuit 32 is transferred from the frame buffer to a television display 24 through a path including a FIFO circuit 34, a lookup table, a data separator 35 and a data mixer 36. Essentially, particularly-addressed lines of data stored in the frame buffer memory 14 are selected by the addresses furnished and placed in the FIFO 34. The data separator 35 separates the different (red, green, blue) color values so that they may be handled individually and transfers the separated values to the mixer 36 where they are selected for transfer to the display 24. The circuitry illustrated shows only one path for the transfer of data but those skilled in the art will recognize that the different color values are, in fact, manipulated separately and then transferred to display 24. All graphics data which does not require enlarging is transferred by means of this path.

On the other hand, data originating at a web page (and similar data originally prepared for presentation on a computer display) which has been downloaded and placed in the frame buffer 14 often needs to be enlarged before presentation on the television display 24. The normal manner in which this is accomplished by prior art systems is by the processor reading the data to be enlarged from the frame buffer, manipulating that data in accordance with one of a number of possible compute-intensive zooming algorithms, writing the enlarged data back to replace data in the frame buffer 14 occupying a selected area sufficient to store the enlarged data, and transferring the enlarged data via the path through the FIFO 34 to the display 24.

Typically, if the system 10 is part of a set top box, the processor will be far less powerful than would be the processor of a conventional computer. Since the algorithms for enlarging data require a very significant amount of processor time, reading the original data from the frame buffer, enlarging the data, and then writing that enlarged data back into the frame buffer is too time consuming to provide a satisfactory result for the viewer with slow processors.

The present invention overcomes these shortcomings. The present invention includes circuitry for enlarging selectable portions of the graphics image which is to be displayed. A first portion of this enlarging circuitry 30 includes a source of addresses of areas of the frame buffer which are to be enlarged for presentation on the television display 24. In one embodiment, this includes an address generator circuit 37 which typically receives from the processor input addresses designating the portion of the frame buffer which is to be enlarged. The addresses specified are used to select the data in the frame buffer memory 14 to be enlarged.

Data at the addresses specified by the circuit 37 beginning at a starting address on a beginning horizontal scan line are transferred to a FIFO circuit 38. In accordance with one aspect of this invention, the data if in index form is transferred via a lookup table 33 so that the index values are translated to color values before enlargement. In this manner, the values provided to the FIFO 38 are either color values or gray scale values which may be accurately enlarged for presentation. The FIFO 38 may be designed to store a complete line of scan data to be presented on the display 24 so that an entire scan line may be enlarged. The FIFO 38 receives control signals from a vertical counter and comparator circuit 39 and from a horizontal counter and comparator circuit 40. The vertical circuit 39 receives input signals from the processor which define the starting and ending vertical positions of the display 24 which are to present the data selected by the circuit 37. Similarly, the horizontal circuit 40 receives input signals from the processor which define the starting and ending horizontal positions of the display 24 which are to present the data selected by addresses specified by the circuit 37.

As the selected pixel data in each horizontal scan line of data are furnished to the FIFO circuit 38, the positions are compared to those of the data transferred to assure that appropriate data is transfer for display. From the FIFO 38, the data selected is transferred to a data separator circuit 41 which functions in the same manner as the circuit 35 to separate the different (red, green, blue) color values of the sequential pixels so that they may be handled individually . In the data The data stream is transferred from the data separator to a vertical zooming circuit 42. Presuming that vertical enlargement is selected, the vertical zooming circuit 42 applies one of a number of well know algorithms to increase the number of pixels vertically in accordance with a zooming ratio furnished by the processor. To accomplish this, a horizontal scan line of pixel data transferred to the circuit 42 is manipulated in a manner which generates from that scan line and at least one previous scan line one or more additional scan lines the pixels of which have values falling between the adjacent pixels of the two original scan lines. The pixels of the generated scan lines may be obtained by using the color values of vertically-adjacent input pixels to generate one or more pixels (depending on the zooming level) which will separate the originally-adjacent pixels on the display. These generated pixels may be obtained in a well known manner such as by linear interpolation which causes each of the individual color values defining the new pixels to vary linearly between the color values of the input pixels or in some more complicated manner.

The vertical zooming process produces a plurality of scan lines of output pixels vertically enlarged in the degree specified by the zooming ratio. The pixels of these scan lines issue sequentially, one scan line after another. As each scan line is generated by the vertical-enlargement process, its pixels are sequentially transferred through a filtering circuit 43 which removes noise generated by the vertical enlargement process from the sequence. Presuming that vertical enlargement of a portion of the display has been selected, the filtered output sequence of each scan line is transferred to a second FIFO 44, a second data separator 45, and back to the vertical zooming circuit 42 where it is utilized with succeeding scan lines to accomplish vertical zooming in the manner just described.

The pixels of the each scan line which issue from the vertical zooming process are also transferred sequentially to a horizontal data zooming circuit 50. Presuming that horizontal enlargement is selected, the zooming circuit 50 applies one of a number of well know algorithms to increase the number of pixels horizontally. The scan line of pixel data transferred to the circuit 50 is manipulated in a manner which generates from that scan line one or more new pixels between each of the pixels of the original scan line. Usually the pixels of a scan line are manipulated sequentially so that newly-generated pixels have values falling between the adjacent pixels of the original scan line. The generated pixels may be obtained by determining the color values of adjacent pixels on the scan line and generating one or more pixels (depending on the zooming level furnished by the processor) which will separate the originally-adjacent pixels on the display. These generated pixels may be obtained in a well known manner by linearly interpolating each of the individual color values defining the pixels between the color values of the input pixels or in some more complicated manner.

Each of the horizontally-expanded lines is then sent through a filtering circuit to remove noise generated by the zooming process. Finally, the scan lines are transferred to the data mixer circuit 36 for transfer to the display 24.

Thus, when a first area of the frame buffer is selected for zooming using addresses furnished by the address generating circuit 37, a first portion of a scan line (which may be the entire scan line) is transferred to the FIFO 38 where its position on the display 24 is determined through the start and end positions provided by the processor. The pixels of the first scan line are transferred via the separator 41 to the vertical data zooming circuit 42. Since this is a first line, it is probable (depending on the algorithm utilized) that the pixels of the scan line will merely be transferred through the circuit 42 and issued as a first portion of a scan line. This scan line portion data will also be transferred back to the vertical data zooming circuit 42 through the second FIFO 44 and data separator 45 for combination with the next scan line to generate new additional scan lines between the first and second scan lines (again, depending on the vertical algorithm utilized).

In the meantime, the first scan line portion will also be transferred to the horizontal data zooming process 50, enlarged as specified by the processor zooming ratio, and issued by the data mixer 36 for presentation by the display 24.

Then the first new additional scan line portion will be generated by the vertical data zooming circuit 42 and presented to the horizontal data zooming circuit for horizontal zooming and display. The first new additional scan line portion will also be rerouted to the vertical data zooming circuit 42 for combination with the preceding scan lines for generation of the next scan in accordance with the vertical zooming algorithm.

Thus, as may be seen, the present invention provides circuitry for utilizing the pixel values in the frame buffer to desired enlargement values selected by the processor without burdening the processor with the execution of the zooming process and the attendant delays. There is no need to read the data from the frame buffer and rewrite it back to the frame buffer after enlarging. Thus there is no need to burden the processor or the data path from the processor to the frame buffer. Consequently, the process is much faster than prior art processes.

Moreover, the provision of separate paths for manipulating the graphics data which is to be enlarged and the data which is not to be modified allows graphics data which might be text in index form or artistic renditions to be manipulated in a manner that the form presented is adapted to best utilize the television display. If, for example, graphics data is text provided in indexed format, it may be changed to a color values adapted to be accurately rendered on a television display during the enlargement processing; while the remainder of the data in the frame buffer which is not being transferred by the enlargement path remains in the original index format. Artists renderings, on the other hand, may be enlarged in a manner to best maintain their appearance on the television display such as by enlarging to different degrees in height and width. In a similar manner, any graphics portion may be enlarged in this selective manner to affect either height or width individually and to the degree desired.

Although the present invention has been described in terms of a preferred embodiment, it will be appreciated that various modifications and alterations might be made by those skilled in the art without departing from the spirit and scope of the invention. For example, the invention might be utilized for reducing the size of graphics images as well as increasing the size of those images for presentation on a television display. The invention should therefore be measured in terms of the claims which follow.

What is claimed is:

1. A circuit for enlarging a selected portion of graphics data generated for a computer display for presentation on a selected portion of a television display without requiring processor manipulation of pixels of the selected portion of graphics data comprising:

a first data path for transferring graphics data from a frame buffer memory storing graphics data to a television display without changing the size of the data;

a second data path for transferring graphics data from the frame buffer memory storing graphics data to the television display while selectably changing the size of the data, the second data path including circuitry for selecting a portion of the television display to present the selected data transferred by the second data path, and enlarging circuitry for enlarging data transferred by the second data path to fill the selected portion of the television display; and means for selecting data stored in the frame buffer for display.

2. A circuit as claimed in claim 1 in which the second data path includes a circuit before the enlarging circuitry for converting selected data represented in index values into color values.

3. A circuit as claimed in claim 1 in which the enlarging circuitry includes circuitry for selectively enlarging in each of horizontal and vertical directions.

4. A circuit as claimed in claim 1 in which the enlarging circuitry includes:

a first FIFO for storing a first sequence of data, a second FIFO a storing a second sequence of data, a combining circuit for combining data in the first and second FIFOs in accordance with an enlarging algorithm, means joining the frame buffer to the first FIFO, and means furnishing output data from the combining circuit to the second FIFO.

5. A circuit utilized to convert a selected portion of graphics data generated for a computer display into video data for presentation on a selected portion of a television display comprising:

a first data path for transferring graphics data from a source of graphics data to a television display without changing the size of the data, and a second data path for transferring graphics data from the source of graphics data to a television display while selectably changing the size of the data, the second data path including circuitry for selecting a portion of the television display on which to present the selected data transferred by the second data path, and zooming circuitry for enlarging data transferred by the second data path to fill the selected portion of the television display.

6. A circuit as claimed in claim 5 in which the second data path includes a circuit before the zooming circuitry for converting selected data represented in index values into color values.

7. A circuit as claimed in claim 5 in which the zooming circuitry includes circuitry for selectively zooming in each of horizontal and vertical directions.

8. A circuit as claimed in claim 5 in which data transferred via the first path may be in one format, and data transferred via the second paths may be in a second format.

9. A circuit as claimed in claim 5 in which the zooming circuitry includes separate paths for individual color values.

10. A circuit as claimed in claim 5 in which the zooming circuitry includes:

a first FIFO for storing a first sequence of data, a second FIFO a storing a second sequence of data, a combining circuit for combining data in the first and second FIFOs in accordance with an enlarging algorithm, means joining the source of graphics data to the first FIFO, and means furnishing output data from the combining circuit to the second FIFO.

11. A method for converting a selected portion of graphics data generated for a computer display into video data for presentation on a selected portion of a television display without requiring processor manipulation of pixels of the selected portion of graphics data comprising the steps of:

transferring graphics data from a source of graphics data to a television display via a first data path without changing the size of the data, and transferring graphics data from the source of graphics data to a television display via a second data path while selectably changing the size of the data, selecting a portion of the television display on which to present the selected data transferred by the second data path, and enlarging data transferred by the second data path to fill the selected portion of the television display.

12. A method as claimed in claim 11 further comprising an additional step of converting selected data transferred by the second data path and represented in index values into color values before enlarging the data.

13. A method as claimed in claim 11 in which the step of enlarging data includes steps of selectively enlarging in each of horizontal and vertical directions.

14. A method as claimed in claim 11 including the further step of changing the graphics data transferred via the second data path to a format different than that of the graphics data transferred via the first path.

* * * * *